Dec. 1, 1953     M. NEIDHART ET AL     2,660,897
INFINITELY-VARIABLE CHANGE-SPEED GEAR
Filed May 16, 1951                      2 Sheets-Sheet 2
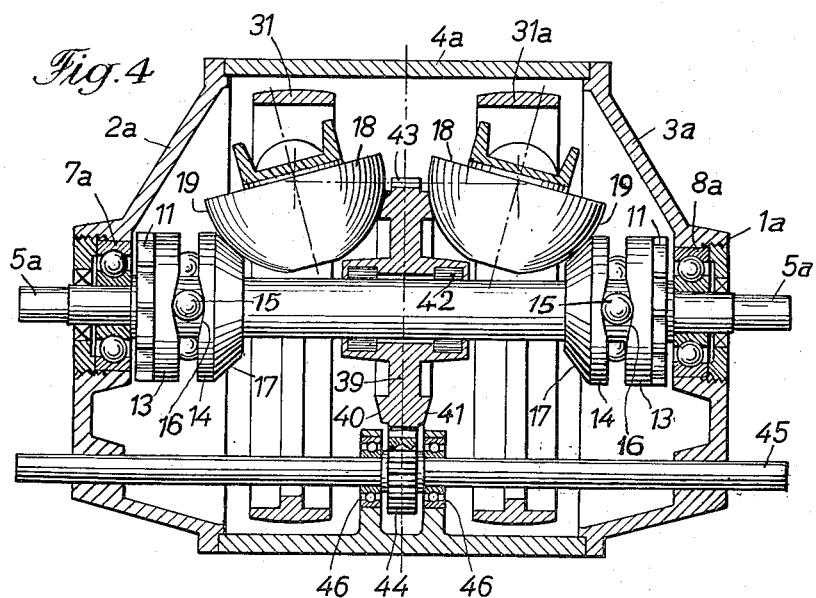
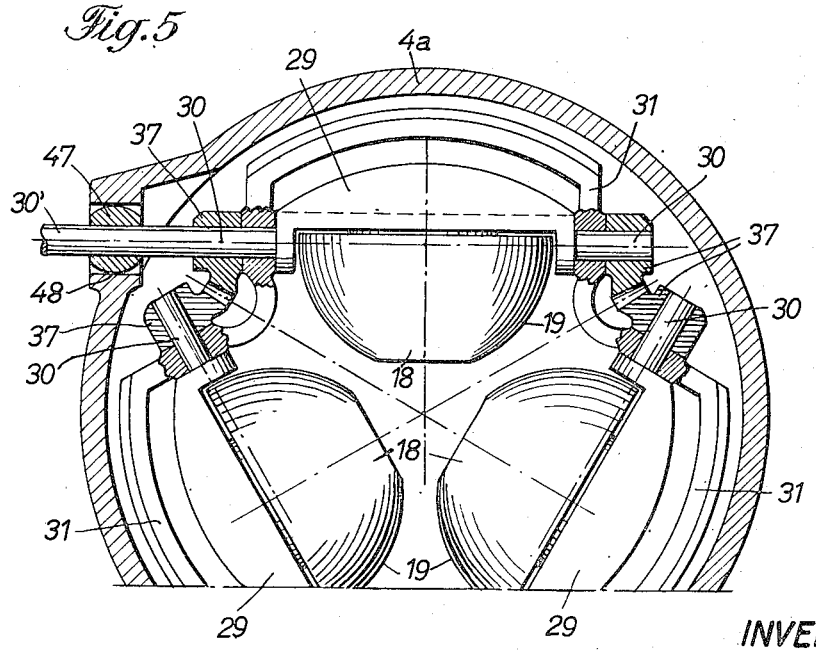
INVENTORS:
Martin Neidhart
and Emil Koller
By Wenderoth, Lind & Ponack
Attys Patented Dec. 1, 1953

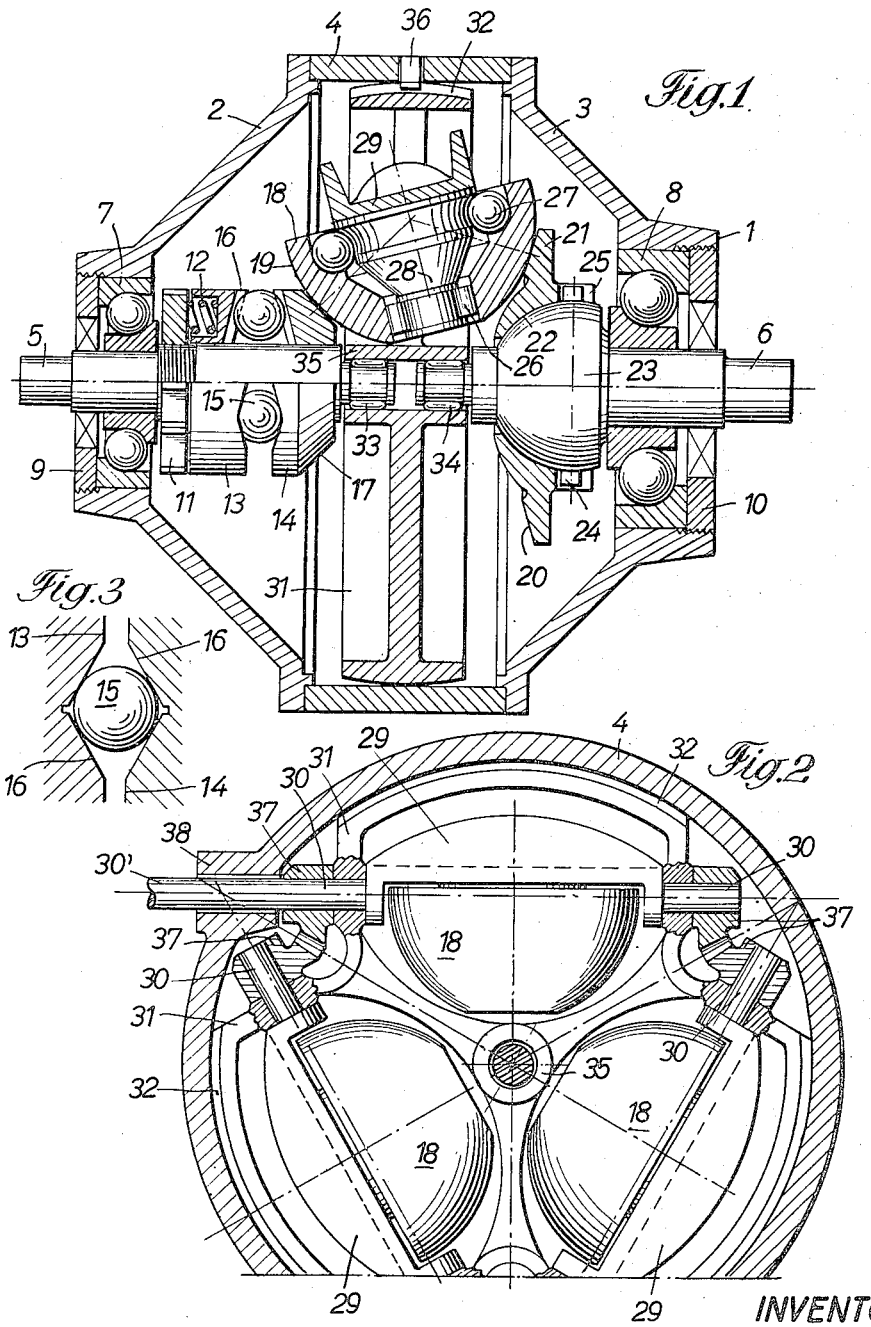

2,660,897

UNITED STATES PATENT OFFICE 2,660,897

INFINITELY-VARIABLE CHANGE-SPEED GEAR

Martin Neidhart, Zug, and Emil Koller, Winterthur, Switzerland, assignors to Dabo Ltd., Zug, Switzerland Application May 16, 1951, Serial No. 226,608
Claims priority, application Switzerland September 20, 1950

8 Claims. (Cl. 74—200)

The stepless gear according to our present invention comprises a set of cooperating frictional bodies having at least one series of three rotary bodies which are uniformly spaced apart circumferentially and have each a spherical frictional surface. The axes of all the rotary bodies are collectively adjustable as to the points of contact between the rotary bodies and the conical friction surfaces of two central frictional bodies which are arranged opposite to each other. One of the latter coacts with the driving shaft, and the other with the driven shaft, one of the two central frictional bodies and the entire series of rotary bodies being oscillatably mounted.

Such arrangement affords a comparatively simple power transmission and easy change of the gear ratio. The oscillation, be that of one of the two central frictional bodies with the conical friction surfaces or of the series of rotary bodies, acts to equalize inaccuracies in the manufacture and assembly of cooperating gear components. The pressure corresponding to the torque to be transmitted, suitably is produced by means of a self-locking mechanism through either of the two central frictional bodies coacting with the driving or driven shaft respectively.

Two forms of our present invention are illustrated in the accompanying drawing in which—

Fig. 1 is an axial section, partly in elevation, of the first form which comprises only one series of rotary bodies;

Fig. 2 is a part cross-section, partly in elevation of Fig. 1,

Fig. 3 shows a portion of a self-locking mechanism for the central frictional body coacting with either gear shaft, Fig. 4 is an axial section, partly in elevation, of the second form which comprises two series of rotary bodies, and Fig. 5 shows a part cross-section, partly in elevation, of Fig. 4.

In the first example (Figs. 1–3), the casing 1 has two lateral covers 2 and 3 which are detachably secured to a cylindrical central member 4 in a manner not further shown.

The two shafts 5, 6 are coaxially disposed in casing 1, and each is supported on a ball bearing 7 and 8 respectively. The said ball bearings on one side abut against a ring 9 and 10 respectively, which are screwed in threaded bores of casing 1. The said ball bearings on the other side abut against a shoulder provided on the shafts 5, 6.

A thrust disc 11 is mounted on a threaded portion of shaft 5 and forms an abutment for a plurality of compression springs 12 which are uniformly spaced apart circumferentially of the disc and disposed in recesses of a ring 13. The latter is mounted axially loose on shaft 5, but is keyed for rotation therewith. A central ring 14 is mounted loose and freely rotatable on shaft 5. Intermediary of said two rings 13, 14 a plurality suitably three as shown, of locking balls 15 are uniformly spaced apart circumferentially and disposed in radial grooves 16 in the said rings, which grooves in cross-section are of double-wedge shape (Fig. 3). Such arrangement affords an axially acting automatic locking means for producing a pressure corresponding to the torque to be transmitted, the axially adjustable thrust disc 11 acting to regulate the pretension of the springs 12 which serve for damping.

The central ring 14 through its conical frictional face 17 cooperates with three uniformly spaced apart rotary bodies 18 which for such purpose are provided with a spherical frictional face 19 through which the bodies 18 on the other hand engage the conical frictional faces 20 of a central disc 21. The latter through a corresponding concave face is mounted on the spherical face 22, of a hub portion 23 of the shaft 6. On hub portion 23 are provided diametrically opposite studs 24 which are engaged in slots 25 disposed on lateral lugs or on a flange of the central frictional disc 21, whereby the latter is positively coupled for rotation with the shaft 6 but is capable of oscillating on the spherical bearing face 22 for the purpose of equalizing structural inaccuracies. Each of the three substantially semi-spherical rotary bodies 18 through rollers 26 and balls 27 is mounted on an axle 28 which is affixed to a carrier 29. The three carriers 29 through axle pins 30 provided on their arms, are mounted on a common closed frame 31. The latter within the range of each carrier 29 comprises an arc 32 which contacts the inside face of the central casing member 4 and has on the outside a transverse circular-arc face, as shown in Fig. 1. The center of the respective arc is situated in the median plane of the frame 31 in the center thereof and on the axis of the two shafts 5, 6. The shouldered ends of the latter are supported in a central hub 35 of frame 31 through two needle bearings 33, 34 which are axially movable in hub 35 by means of the shafts 5, 6. Within the range of the arcs 32, the frame 31 through a pin 36 is connected for rotation with the casing member 4.

On the axle pins 30 which are pairwise adjacent each other, as shown in Fig. 2, segmental bevel gears 37 are affixed, which mesh with each other so that the three carriers are positively coupled to each other in order to adjust the same together about axes transversely of the gear axis. The two carriers 29 lying laterally in Fig. 2, may be similarly interconnected at their other ends (not shown) through segmental bevel gears.

For said carrier-adjusting purpose, the left-hand axle pin 30 of the upper carrier 29 in Fig. 2, is extended at 30'. The extension 30' passes through a bearing 38 provided in casing member 4 and carries a manual adjusting means (not shown) at its left-hand end.

On rotation of gear shaft 5, the central ring 14 is also rotated by the rotating ring 13 through the locking balls 15. Such rotation through the frictional face 17 of ring 14 is transmitted by means of the three rotary bodies 18 onto the central frictional disc 21, and, thus, via the studs 24 onto the shaft 6. Such transmission takes place at a certain gear ratio which is variable by moving the point of contact, between the central frictional ring 14 and the series of rotary bodies 18, whereby the point of contact between the frictional faces 19 and 20 is shifted. Such change of the the gear ratio between the shafts 5, 6 is brought about by tipping the axles 28 of the rotary bodies 18 through rocking the carriers 29 in either sense by means of the manually operated element on the free end of the axle extension 30' of said one carrier 29.

In the form of invention just described, the apices of the conical frictional faces 17, 20 of the centrally and coaxially disposed frictional bodies 14 and 21 respectively, are adjacent each other. Further, the apices of the conical surfaces built up on the basis of the operating circles (contact circles) on the rotary bodies 18, are situated on axes which are disposed between the apices of the conical faces 17 and 20. Such arrangement affords a favorable frictional engagement, small wear and tear, the feasibility of transmitting a relatively high power and a higher efficiency.

In the second example (Figs. 4, 5) two series of rotary bodies 18 are provided, of which one is disposed in the first bearing frame 31 and the other in the second bearing frame 31a which is similar to the first and disposed symmetrically thereto. The two frames 31, 31a are not guided in the central casing member 4a, neither radially nor axially. The three rotary bodies 18 of both series coact on one hand with the conical frictional faces 17 of the two central frictional rings 14 of which each constitutes one portion of an automatic ball locking mechanism and, on the other hand, with a common central frictional disc 39 which is disposed between the said two series and has on each of its two sides a conical face 40 or 41 for frictional engagement with the spherical faces 19 of the respective rotary bodies 18. The frictional disc 39 by means of needle bearings 42 is rotatably and axially movably mounted on the gear shaft 5a which passes through the casing 1a and supports the two locking mechanisms involving the frictional rings 14. The two bearing frames 31, 31a which are detached from the gear casing 1a, are self-aligning on the conical faces 17, 40 and 17, 41 of the two frictional rings 14 and of the frictional disc 39, by means of their associated spherical rotary bodies 18. The disc 39 through an external gear-wheel rim 43 engages a spur wheel 44 affixed on a shaft 45 which passes through the casing 1a and is supported therein on two ball bearings 46.

As illustrated in Fig. 5, each of the two frames 31, 31a through an axle extension 30' of the upper carrier 29 is oscillatably supported in a bearing 47 provided in the casing member 4a. Each bearing 47 through a spherical face is mounted in an opening 48 of casing member 4a, which arrangement allows the two frames to oscillate about their two bearings, and the axle extensions 30' retain the two frames 31, 31a in the bearings 47 against rotation. The two frames are operatively interconnected at the axle extensions 30' of the two respective carriers 29 by means of arms or toothed segments (not shown) so as to be manually adjustable with the aid of a common actuating element (not shown). Such adjustment serves for changing the position of the rotary bodies 18 of both series with respect to their points of contact with the associated central frictional ring 14 on one hand and with the common central frictional disc 39 on the other hand with a view of changing the gear ratio between the driving shaft 5a and the driven shaft 45. Since, in this second form of invention, both ends of the two shafts 5a and 45 are free, either end may be used for connection to a source of power or to a machine to be driven.

The second form of invention just described is suitable for transmitting greater forces than the first form.

In the second form of invention, the central frictional body 39 which is common to both series of rotary bodies, could be made up of several portions and formed as an axially operating self-acting locking mechanism.

What we claim and desire to secure by Letters Patent is:

1. A mechanical stepless gear comprising a casing, a driving shaft and a driven shaft mounted in said casing, a plurality of coacting frictional bodies, said bodies including at least one series of three rotary bodies uniformly spaced apart circumferentially of the casing and at least two central opposite bodies of which one coacts with the driving shaft and the other with the driven shaft, each rotary body having a spherical frictional face, each control body having at least one conical frictional face, a common frame supporting the axles of said rotary bodies for automatic centering of said spherical faces on said conical surfaces, means for adjusting the axles of all the said rotary bodies with respect to their points of contact with the said faces of the central bodies, in order to vary the gear ratio, bearing means adapted to permit either one of said central bodies or the entire series of said rotary bodies to oscillate, an axially operating self-acting locking mechanism associated with one of said central bodies, said rotary bodies through axle pins being mounted in a common frame which by means of all the rotary bodies is capable of self-alignment on the conical faces of the central bodies, and said frame having means for the common adjustment of all the rotary bodies with respect to the points of contact thereof with the conical frictional faces of the two central bodies.

2. A mechanical stepless gear comprising a casing, a driving shaft and a driven shaft mounted in said casing, a plurality of coacting frictional bodies, said bodies including at least one series of three rotary bodies uniformly spaced apart circumferentially of the casing and at least two central opposite bodies of which one coacts with the driving shaft and the other with the driven shaft, each rotary body having a spherical frictional face, each central body having at least one conical frictional face, a common frame supporting the axles of said rotary bodies for automatic centering of said spherical faces on said conical surfaces, means for adjusting the axles of all the said rotary bodies with respect to their points of contact with the said faces of the central bodies, in order to vary the gear ratio, bearing means adapted to permit either one of said central bodies or the entire series of said rotary bodies to oscillate, an axially operating self-acting locking mechanism associated with one of said central bodies, said rotary bodies being mounted in carriers which are swiveled in a common frame about axles disposed transversely of the driving and driven shafts, and means for positively interconnecting the carriers operatively.

3. A mechanical stepless gear comprising a casing, a driving shaft and a driven shaft mounted in said casing, a plurality of coacting frictional bodies, said bodies including at least one series of three rotary bodies uniformly spaced apart circumferentially of the casing and at least two central opposite bodies of which one coacts with the driving shaft and the other with the driven shaft, each rotary body having a spherical frictional face, each central body having at least one conical frictional face, a common frame supporting the axles of said rotary bodies for automatic centering of said spherical faces on said conical surfaces, means for adjusting the axles of all the said rotary bodies with respect to their points of contact with the said faces of the central bodies, in order to vary the gear ratio, bearing means adapted to permit either one of said central bodies or the entire series of said rotary bodies to oscillate, an axially operating self-acting locking mechanism associated with one of said central bodies, said series of rotary bodies being mounted in a frame for oscillatory movement and the central body affixed for rotation to one of said shafts is mounted through a corresponding concave face on the spherical face of a hub portion of said one shaft.

4. A mechanical stepless gear comprising a casing, a driving shaft and a driven shaft mounted in said casing, a plurality of coacting frictional bodies, said bodies including two series of three rotary bodies each and three central bodies disposed in line, the two outside ones of said central bodies being provided with a conical friction face and the intermediate central one of said bodies being provided with such a face on both sides, each rotary body having a spherical frictional face, each central body having at least one conical frictional face, a common frame supporting the axles of said rotary bodies for automatic centering of said spherical faces on said conical surfaces, means for adjusting the axles of all the said rotary bodies with respect to their points of contact with the said faces of the central bodies, in order to vary the gear ratio, bearing means adapted to permit either one of said central bodies or the entire series of said rotary bodies to oscillate, an axially operating self-acting locking mechanism associated with one of said central bodies, each of said series through axle pins being mounted in a carrier which by means of the three rotary bodies is capable of self-alignment on said conical faces, and the intermediate body being connected for positive rotation with the second shaft.

5. A mechanical stepless gear comprising a casing, a driving shaft and a driven shaft mounted in said casing, a plurality of coacting frictional bodies, said bodies including two series of three rotary bodies each and three central bodies disposed in line, the two outside ones of said central bodies being provided with a conical friction face and the intermediate central one of said bodies being provided with such a face on both sides, each rotary body having a spherical frictional face, each central body having at least one conical frictional face, a common frame supporting the axles of said rotary bodies for automatic centering of said spherical faces on said conical surfaces, means for adjusting the axles of all the said rotary bodies with respect to their points of contact with the said faces of the central bodies, in order to vary the gear ratio, bearing means adapted to permit either one of said central bodies or the entire series of said rotary bodies to oscillate, an axially operating self-acting locking mechanism associated with one of said central bodies, each of said series through axle pins being mounted in a carrier which by means of the three rotary bodies is capable of self-alignment on said conical faces, and the intermediate body being connected for positive rotation with the second shaft, and the intermediate body being mounted on the driving shaft in an axially movable and rotatable relation.

6. A mechanical stepless gear comprising a casing, a driving shaft and a driven shaft mounted in said casing, a plurality of coacting frictional bodies, said bodies including two series of three rotary bodies each and three central bodies disposed in line, the two outside ones of said central bodies being provided with a conical friction face and the intermediate central one of said bodies being provided with such a face on both sides, each rotary body having a spherical frictional face, each central body having at least one conical frictional face, a common frame supporting the axles of said rotary bodies for automatic centering of said spherical faces on said conical surfaces, means for adjusting the axles of all the said rotary bodies with respect to their points of contact with the said faces of the central bodies, in order to vary the gear ratio, bearing means adapted to permit either one of said central bodies of the entire series of said rotary bodies to oscillate, an axially operating self-acting locking mechanism associated with one of said central bodies, each of said series through axle pins being mounted in a carrier which by means of the three rotary bodies is capable of self-alignment on said conical faces and the intermediate body being connected for positive rotation with the second shaft, each of the two series of rotary bodies through a carrier being disposed on a frame, adjusting means for positively interconnecting operatively on one hand the carriers mounted on the same frame and, on the other hand, the carriers of both series of rotary bodies.

7. A mechanical stepless gear comprising a casing, a driving shaft and a driven shaft mounted in said casing, a plurality of coacting frictional bodies, said bodies including two series of three rotary bodies each and three central bodies disposed in line, the two outside ones of said central bodies being provided with a conical friction face and the intermediate central one of said bodies being provided with such a face on both sides, each rotary body having a spherical frictional face, each central body having at least one conical frictional face, a common frame support- ing the axles of said rotary bodies for automatic centering of said spherical faces on said conical surfaces, means for adjusting the axles of all the said rotary bodies with respect to their points of contact with the said faces of the central bodies, in order to vary the gear ratio, bearing means adapted to permit either one of said central bodies or the entire series of said rotary bodies to oscillate, an axially operating self-acting locking mechanism associated with one of said central bodies, each of said series through axle pins being mounted in a carrier which by means of the three rotary bodies is capable of self-alignment on said conical faces, and the intermediate body being connected for positive rotation with the second shaft and the intermediate body is a plural-part structure formed as an axially operating self-acting locking mechanism.

8. A mechanical stepless gear comprising a casing, a driving shaft and a driven shaft mounted in said casing, a plurality of coacting frictional bodies, said bodies including at least one series of three rotary bodies uniformly spaced apart circumferentially of the casing and at least two central bodies of which one coacts with the driving shaft and the other with the driven shaft, each rotary body having a spherical frictional face, each central body having at least one conical frictional face, a common frame supporting the axles of said rotary bodies for automatic centering of said spherical faces on said conical surfaces, means for adjusting the axles of all the said rotary bodies with respect to their points of contact with the said faces of the central bodies in order to vary the gear ratio, bearing means adapted to permit either one of said central bodies or the entire series of said rotary bodies to oscillate, an axially operating self-acting locking mechanism associated with one of said central bodies and said series of rotary bodies being mounted in a frame for oscillatory movement.

MARTIN NEIDHART.
EMIL KOLLER.

References Cited in the file of this patent

UNITED STATES PATENTS

| Number | Name | Date |
| --- | --- | --- |
| 767,604 | Sperry | Aug. 16, 1904 |
| 1,775,201 | Jacobsen | Sept. 9, 1930 |
| 1,878,068 | Van Berkel | Sept. 20, 1932 |
| 2,109,845 | Madle | Mar. 1, 1938 |
| 2,134,225 | Christiansen | Oct. 25, 1938 |

FOREIGN PATENTS

| Number | Country | Date |
| --- | --- | --- |
| 683,063 | Germany | Oct. 30, 1939 |
| 476,589 | Great Britain | Dec. 13, 1937 |